US012280003B1

(12) United States Patent
Scherr

(10) Patent No.: US 12,280,003 B1
(45) Date of Patent: Apr. 22, 2025

(54) EASY BACK ADJUSTER

(71) Applicant: Thomas Scherr, Baltimore, MD (US)

(72) Inventor: Thomas Scherr, Baltimore, MD (US)

( * ) Notice: Subject to any disclaimer, the term of this patent is extended or adjusted under 35 U.S.C. 154(b) by 0 days.

(21) Appl. No.: 18/612,779

(22) Filed: Mar. 21, 2024

(51) Int. Cl.
*A61H 1/00* (2006.01)

(52) U.S. Cl.
CPC ..... *A61H 1/008* (2013.01); *A61H 2201/0157* (2013.01); *A61H 2201/1284* (2013.01); *A61H 2201/1626* (2013.01); *A61H 2205/081* (2013.01); *A61H 2205/088* (2013.01)

(58) Field of Classification Search
CPC .................... A61H 1/008; A61H 1/005; A61H 2015/0007; A61H 2015/0014; A61F 5/028; A61F 5/026; A61F 5/024
See application file for complete search history.

(56) References Cited

U.S. PATENT DOCUMENTS 3,675,644 A * 7/1972 Laskowitz ......... A61H 15/0078 601/103
5,643,182 A * 7/1997 Engel ................. A61H 15/0092 601/123
6,071,253 A * 6/2000 Rivera ................... A61H 15/00 601/118
2015/0257962 A1* 9/2015 Shannon ................ A61H 15/00 601/98
2021/0169732 A1* 6/2021 Smith ..................... A61F 5/028

* cited by examiner

*Primary Examiner* — Camtu T Nguyen

(57) ABSTRACT

The Easy Back Adjuster is a device comprising a hard tubular frame that is rectangular in overall shape, and is made of tubular plastic or metal, and three flexible cylindrical pads. Two of the flexible cylindrical pads are located on the top latitudinal bar of the rectangular frame, and one flexible cylindrical pad is located on the bottom latitudinal bar of the frame.

1 Claim, 2 Drawing Sheets

TOP VIEW

EASY BACK ADJUSTER

SIDE VIEW

EASY BACK ADJUSTER

EASY BACK ADJUSTER

BACKGROUND OF THE INVENTION

I have one leg that is shorter than the other following an automobile accident and eighteen surgeries on my leg. This condition throws my back out of alignment just from doing everyday things like walking and bending etc., and this causes back pain, hip pain and headaches too.

Many many people besides me suffer from having one leg shorter than the other for many different reasons. And many people need relief from back pain, hip pain and the headaches that are caused by misalignment. My Easy Back Adjuster realigns my back and hips, which helps me live a more active and pain free life and it can help others to live a more active and pain free life too.

There is nothing that looks like or works like Easy Back Adjuster on the market today that people can purchase at this time to correct their misalignment and give them the pain relief they want and need.

DETAILED DESCRIPTION OF THE INVENTION

Figure 1:
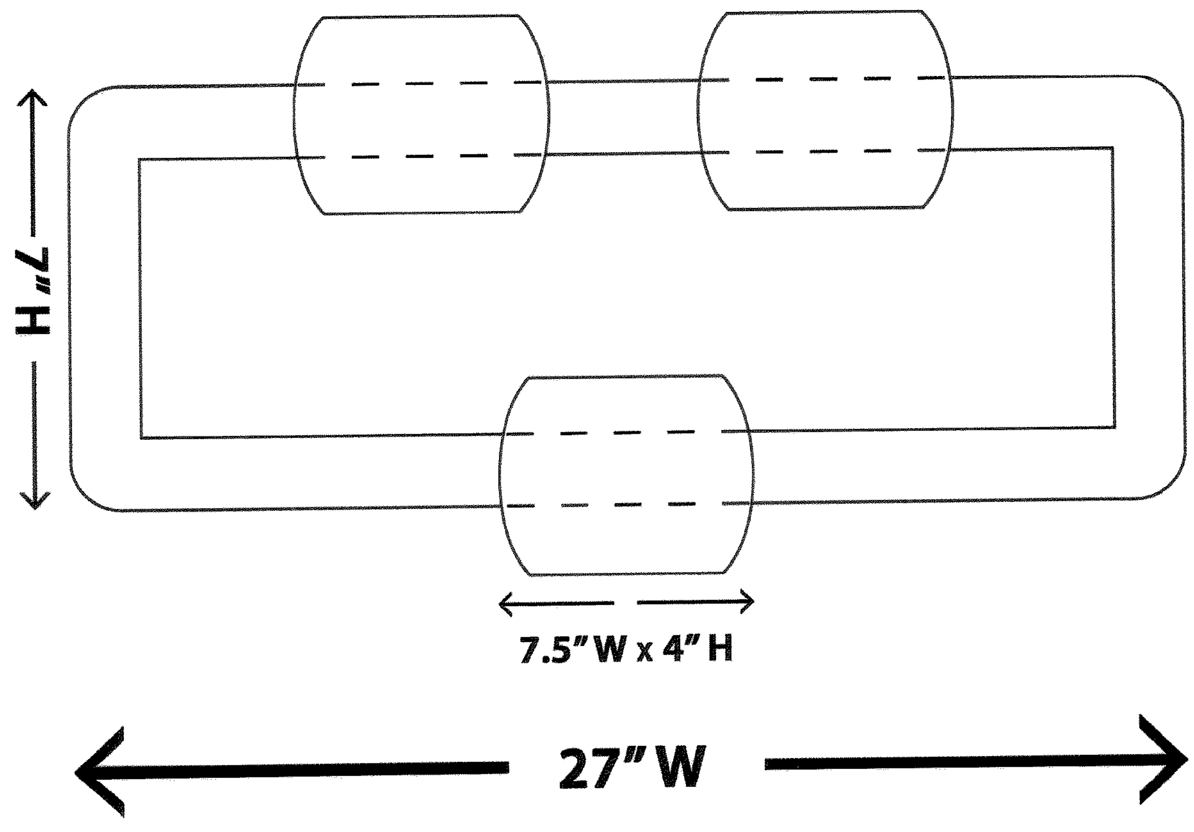
FIG. 1 shows a Top view of the Easy Back Adjuster.
Figure 2:
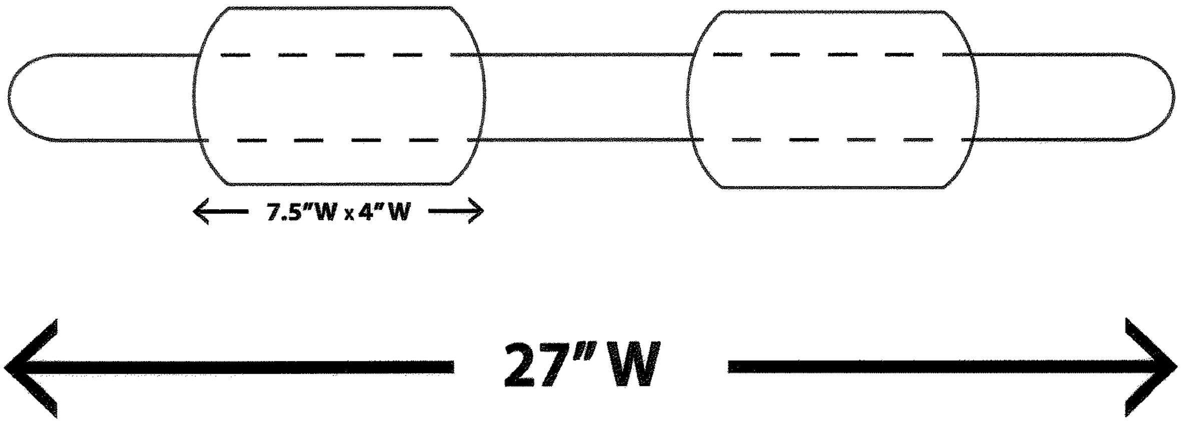
FIG. 2 shows a Front view of the Easy Back Adjuster.

In its present configuration, page 1 of the Easy Back Adjuster shows the overview of the rectangular shaped frame 27"W×7"H which is made of 1" PVC plastic pipe (C) and 1" PVC 90 degree plastic elbows (B). FIG. 1 shows the three flexible cylindrical foam pads (A) mounted on the two latitudinal members of the PVC pipe frame (C). Two of the flexible cylindrical foam pads (A) are located on the top 27" latitudinal frame (C) and one flexible cylindrical foam pads (A) is located on the bottom 27" latitudinal frame (C).

In its present configuration, page 2 of the Easy Back Adjuster shows the side view of the 1" PVC pipe frame (C) and the 1" PVC plastic 90 degree elbows (B) and shows the flexible cylindrical foam pads (A) mounted on the two latitudinal members of the frame (C).

The following is the specific 3 step method that will realign the back, and, the 5 step method that will realign the back and the hips:

Step 1

Sit down on a comfortable surface such as a carpet or rug. Before laying down on your back place the single foam roller of the Easy Back Adjuster against your lower back with the double roll end facing toward your head. Cross your aims to your chest, take a deep breath, lay down on Easy Back Adjuster letting your air out and relax and feel your back adjust.

Step 2

Sit up and position Easy Back Adjuster approximately two inches up to your middle of back from the first position in Step 1 and then cross your arms take a deep breath lay down on Easy Back Adjuster letting your air out and relax and feel your back adjust.

Step 3: Sit up and position Easy Back Adjuster approximately two more inches up to your upper back and cross your arms across your chest take a deep breath lay down on Easy Back Adjuster letting your air out and relax and feel your back adjust.

The two last steps 4 and 5 adjusts the hips.

Step 4: Sit up with both legs straight out and position the single roll of Easy Back Adjuster at the middle of your back and then lay back down on Easy Back Adjuster. Cross your right leg over top of your left leg as your breathing out all the way to the left as far as is comfortable for you. Then return your right leg to the original position of being straight out alongside the other leg.

Step 5: with the single roll of Easy Back Adjuster still positioned at the middle of the back and still laying down, Take your left leg and move it over top of your right leg breathing out all the way to the right as far as is comfortable for you. Then return your left leg to the original position of being straight out alongside the other leg.

After step 5 enjoy how much better you feel. You may repeat the steps 1 through 3, or, 1 through 5, if desired at a later time.

SUMMARY OF THE INVENTION

Easy Back Adjuster is a lightweight, compact and portable device that is used to realign the back whenever desired.

The invention claimed is:

1. A back adjusting device configured to realign a back and hips of a user, the back adjusting device consisting of:

- a rectangular shaped frame made of tubular plastic or metal including a first latitudinal member and a second latitudinal member parallel to the first latitudinal member;
- a first flexible cylindrical foam pad located on the first latitudinal member of the rectangular shaped frame;
- a second flexible cylindrical foam pad located on the first latitudinal member of the rectangular shaped frame; and
- a third flexible cylindrical foam pad located on the second latitudinal member of the rectangular shaped frame,
- wherein the first and second flexible cylindrical foam pads are located on a first longitudinal axis of the first latitudinal member, and the third flexible cylindrical foam pad is located on a second longitudinal axis of the second latitudinal member of the rectangular shaped frame;
- wherein the first longitudinal axis is parallel to the second longitudinal axis;
- wherein the three foam pads are each non-rotatably fixed to the respective first and second latitudinal members, and
- wherein the back adjusting device is configured to be portable.

* * * * *